(12) United States Patent
Shi et al.

(10) Patent No.: US 8,223,477 B2
(45) Date of Patent: Jul. 17, 2012

(54) SLIDABLE PORTABLE ELECTRONIC DEVICE

(75) Inventors: Zhi-Qiang Shi, Shenzhen (CN); Qiang Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 270 days.

(21) Appl. No.: 12/766,203

(22) Filed: Apr. 23, 2010

(65) Prior Publication Data

US 2011/0051331 A1 Mar. 3, 2011

(30) Foreign Application Priority Data

Aug. 26, 2009 (CN) .......................... 2009 1 0306124

(51) Int. Cl.
*H05K 5/00* (2006.01)
*H05K 7/00* (2006.01)
*H04M 1/00* (2006.01)
*G06F 3/02* (2006.01)
*G09G 5/00* (2006.01)

(52) U.S. Cl. ........... 361/679.01; 361/679.09; 361/679.3; 361/379.55; 361/679.56; 361/379.57; 455/575.1; 455/575.3; 455/575.4; 455/575.8; 345/168; 345/169; 345/184

(58) Field of Classification Search ............. 361/679.01, 361/679.02, 679.08, 679.09, 679.3, 679.55–679.59; 345/156, 157, 168, 169, 184; 455/575.1, 455/575.3, 575.4, 575.8
See application file for complete search history.

(56) References Cited

U.S. PATENT DOCUMENTS

2007/0142101 A1\* 6/2007 Seshagiri et al. ........... 455/575.4
2008/0261659 A1\* 10/2008 Jang et al. .................... 455/566
\* cited by examiner

*Primary Examiner* — Jayprakash N Gandhi
*Assistant Examiner* — Jerry Wu
(74) *Attorney, Agent, or Firm* — Altis Law Group, Inc.

(57) ABSTRACT

A portable electronic device includes a base, a cover, a plurality of first positioning element, a plurality of second positioning element, and a connecting element. The first positioning elements attach to the cover. The second positioning element attach to the base. The connecting element slidably and rotatably connects the base to the cover. The first positioning elements attract the second positioning elements by magnetic force.

10 Claims, 12 Drawing Sheets

SLIDABLE PORTABLE ELECTRONIC DEVICE

BACKGROUND

1. Technical Field

The present disclosure generally relates to portable electronic devices and, particularly, to a portable electronic device having a sliding mechanism.

2. Description of Related Art

The rapid development of portable electronic devices, such as mobile phones, or personal digital assistances (PDAs), digital cameras, etc., make people's life more convenient. The cover-slidable portable electronic device is popular with the consumer for its functional style. The cover-slidable portable electronic device usually includes a cover, a base, and a sliding mechanism slidably connecting the base to the cover. The sliding mechanism includes a torsion spring. One end of the torsion spring is attached to the base and the other end of the torsion spring is attached to the cover to supply torsion force for the cover-slidable portable electronic device. However, the torsion spring may fatigue and fail after repeated use.

Therefore, there is room for improvement within the art.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the portable electronic device. Moreover, in the drawings, like reference numerals designate corresponding parts throughout the several views, in which.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
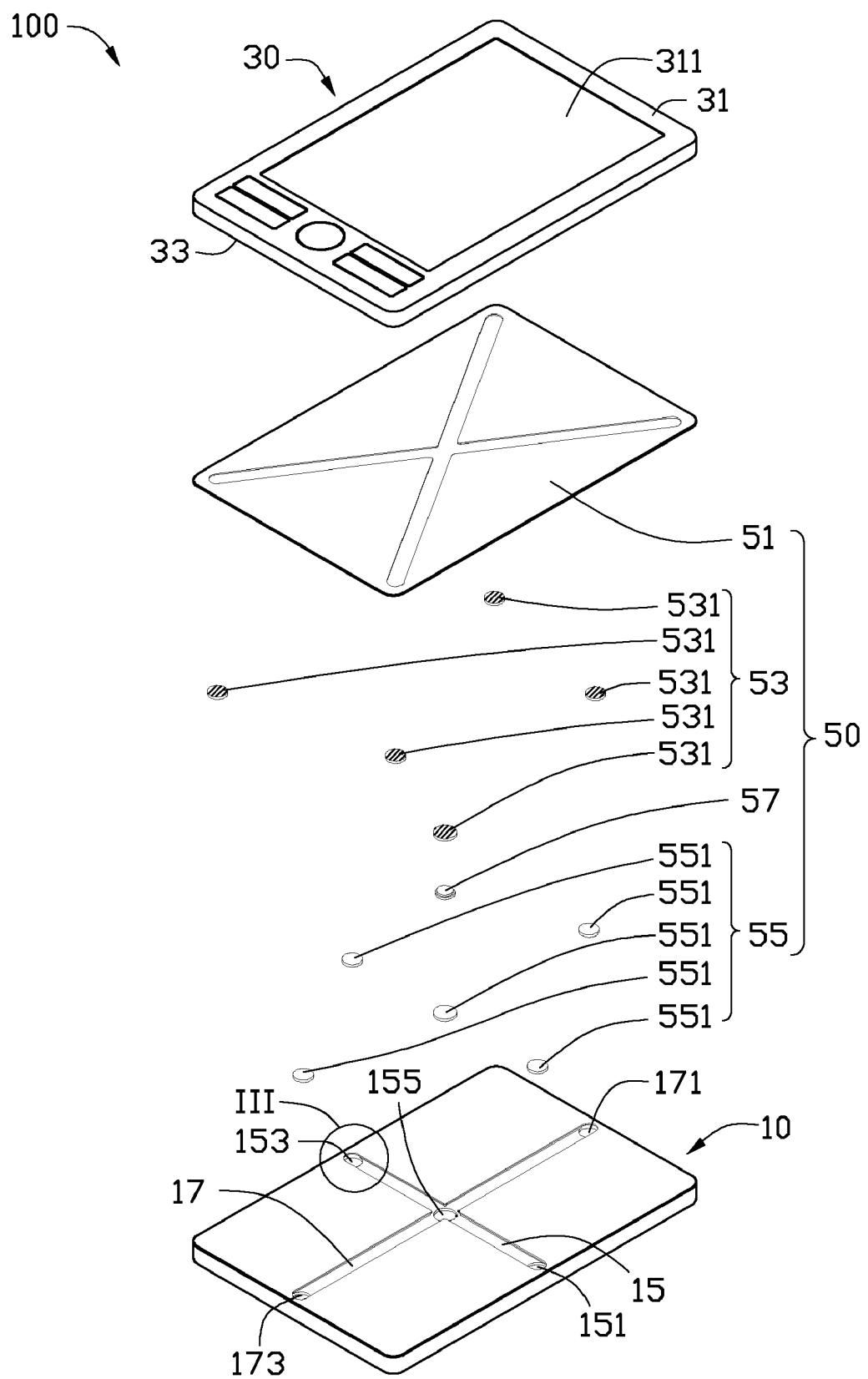
FIG. 1 is an explored, isometric view of a first embodiment of a portable electronic device.
Figure 2:
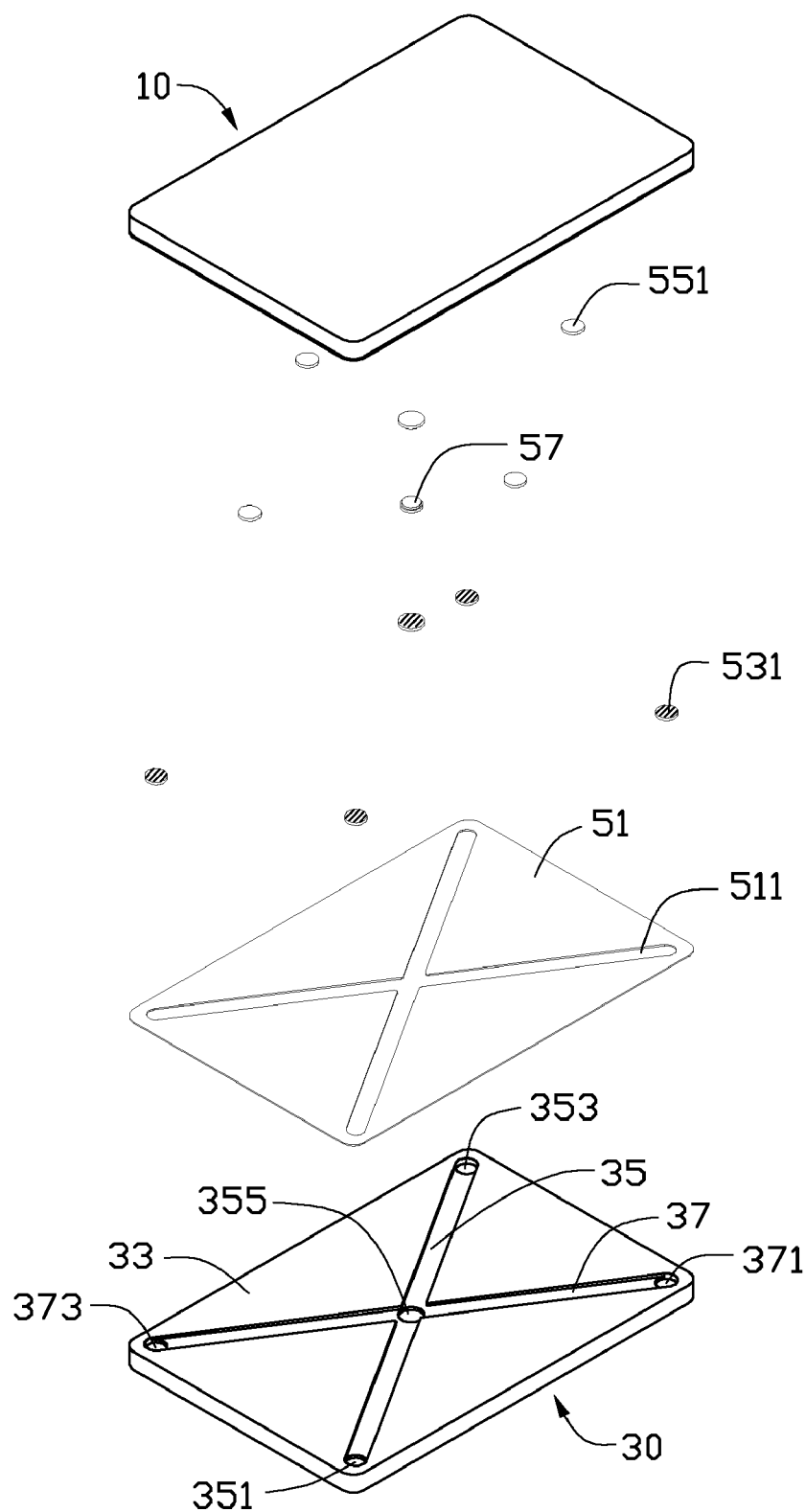
FIG. 2 is similar to FIG. 1, but viewed from another aspect.

FIGS. 1 and 2 show a portable electronic device 100. The portable electronic device 100 includes a base 10, a cover 30, and a sliding mechanism 50. The cover 30 attaches, slidably and rotatably to the base 10 using the sliding mechanism 50.

Figure 3:
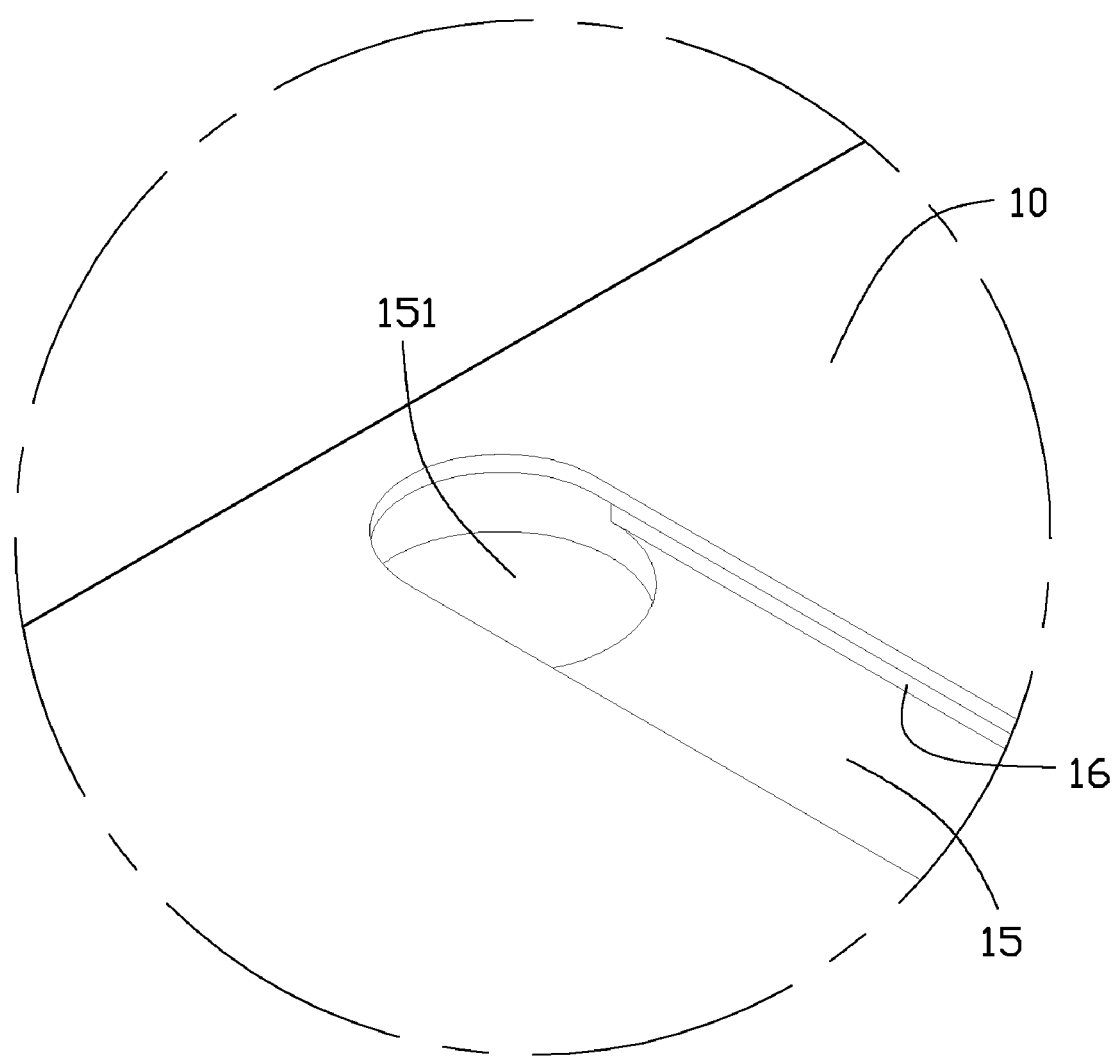
FIG. 3 is enlarged view of a base of FIG. 1.

On one side thereon, the base 10 defines a first slot 15 and a second slot 17. In the exemplary embodiment, the base 10 is substantially rectangular, and includes two longitudinal edges and two transverse edges. The first slot 15 communicates with the second slot 17. The two slots 15 and 17 are respectively aligned at the mid-points of the longitudinal edges and the transverse edges, respectively thereby constituting a crossbar shape. Each of the sidewalls of the slots 15 and 17 define a slit 16, as shown in FIG. 3. The base 10 defines a plurality of receiving bores therein, in the exemplary embodiment, the base 10 defines a first receiving bore 151 at one end of the first slot 15, a second receiving bore 153 at the other end of the first slot 15, a third receiving bore 171 at one end of the second slot 17, a fourth receiving bore 173 at the other end of the second slot 17, and a fifth receiving bore 155 at an intersection position between the first slot 15 and the second slot 17.

The cover 30 includes a first surface 31 and a second surface 33 opposite to the first surface 31. The first surface 31 carries a display 311 to display the information of the portable electronic device 100. The second surface 33 defines a first channel 35 and a second channel 37. The first channel 35 communicates with the second channel 37. The two channels 35 and 37 are arranged diagonally to form an X-shape. The cover 30 defines a plurality of receiving cavities, in the exemplary embodiment, the cover 30 defines a first receiving cavity 351 at one end of the first channel 35, a second receiving cavity 353 at the other end of the first channel 35, a third receiving cavity 371 at one end of the second channel 37, a fourth receiving cavity 373 at the other end of the second channel 37, and a fifth receiving cavity 355 at an intersection position between the first channel 35 and the second channel 37.

The sliding mechanism 50 includes a positioning panel 51, a plurality of first positioning elements 53, a plurality of second positioning element 55, and a connecting element 57. Each of the first positioning elements 53 is received in one of the receiving bores. Each of the second positioning elements 55 is received in one of the receiving cavities. The positioning panel 51 defines a through guiding hole 511. In the exemplary embodiment, the positioning panel 51 is approximately rectangular. The guiding hole 511 is diagonally formed in the positioning panel 51 such that the guiding hole 511 has a pattern of X-shape and is similar to the combined pattern of the channels 35 and 37. The width of the guiding hole 511 is less than the diameter of the connecting element 57. In the first exemplary embodiment, the first positioning elements 53 are five first magnetic elements 531, and the second positioning elements 55 are five second magnetic elements 551 with polarity differing from that of the first magnetic elements 531, such that any of the first magnetic elements 531 can attract a second magnetic element 551 to retain the cover in a selected position retain the cover 30 in a selected position by magnetic force.

In the first exemplary embodiment, the connecting element 57 is made of magnetic metallic material. Thus, the connecting element 57 can therefore also be attracted by or two the first positioning elements 53 and the second positioning elements 55.

Figure 4:
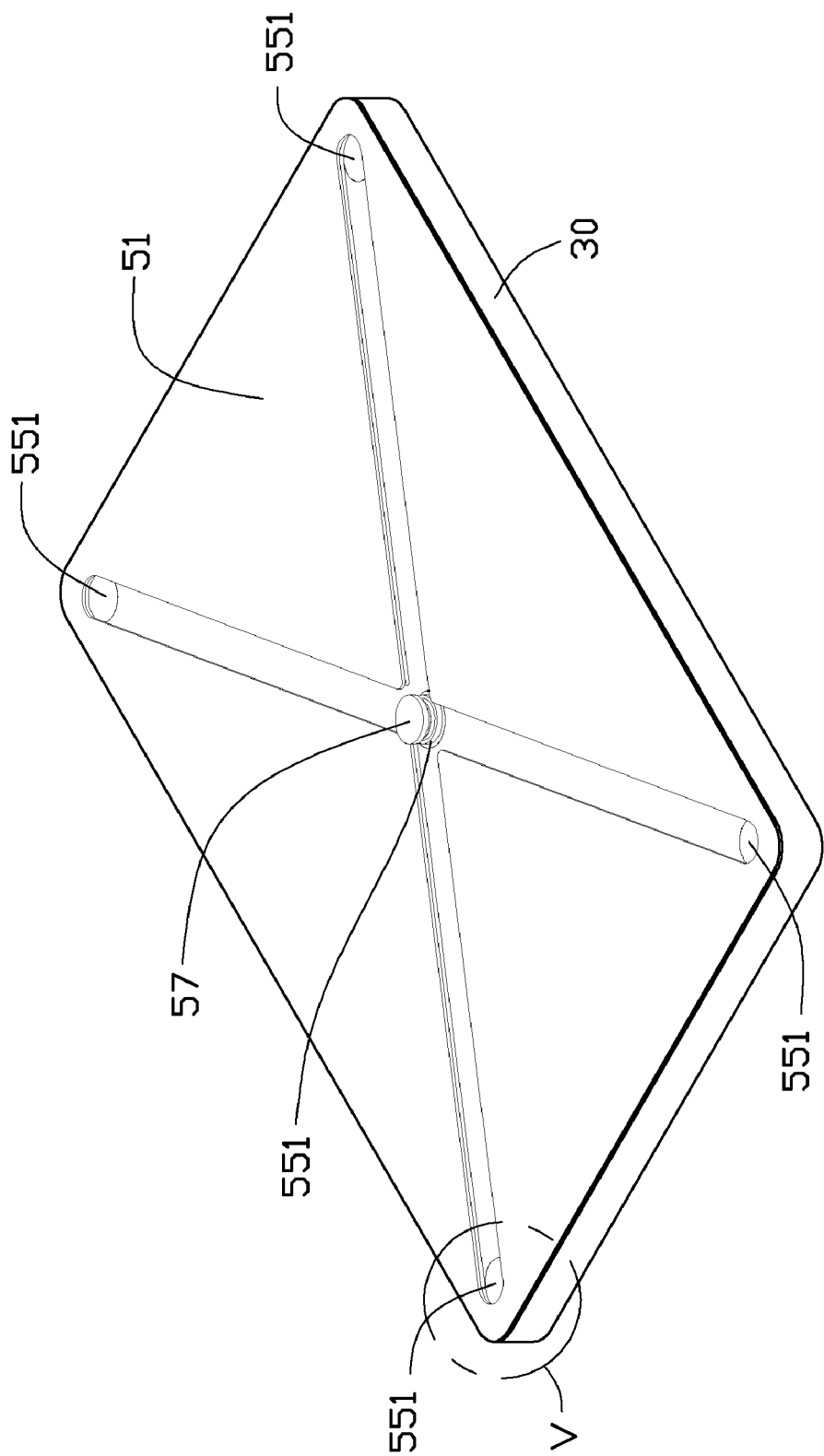
FIG. 4 is an assembled, isometric view of the base and the sliding mechanism.
Figure 5:
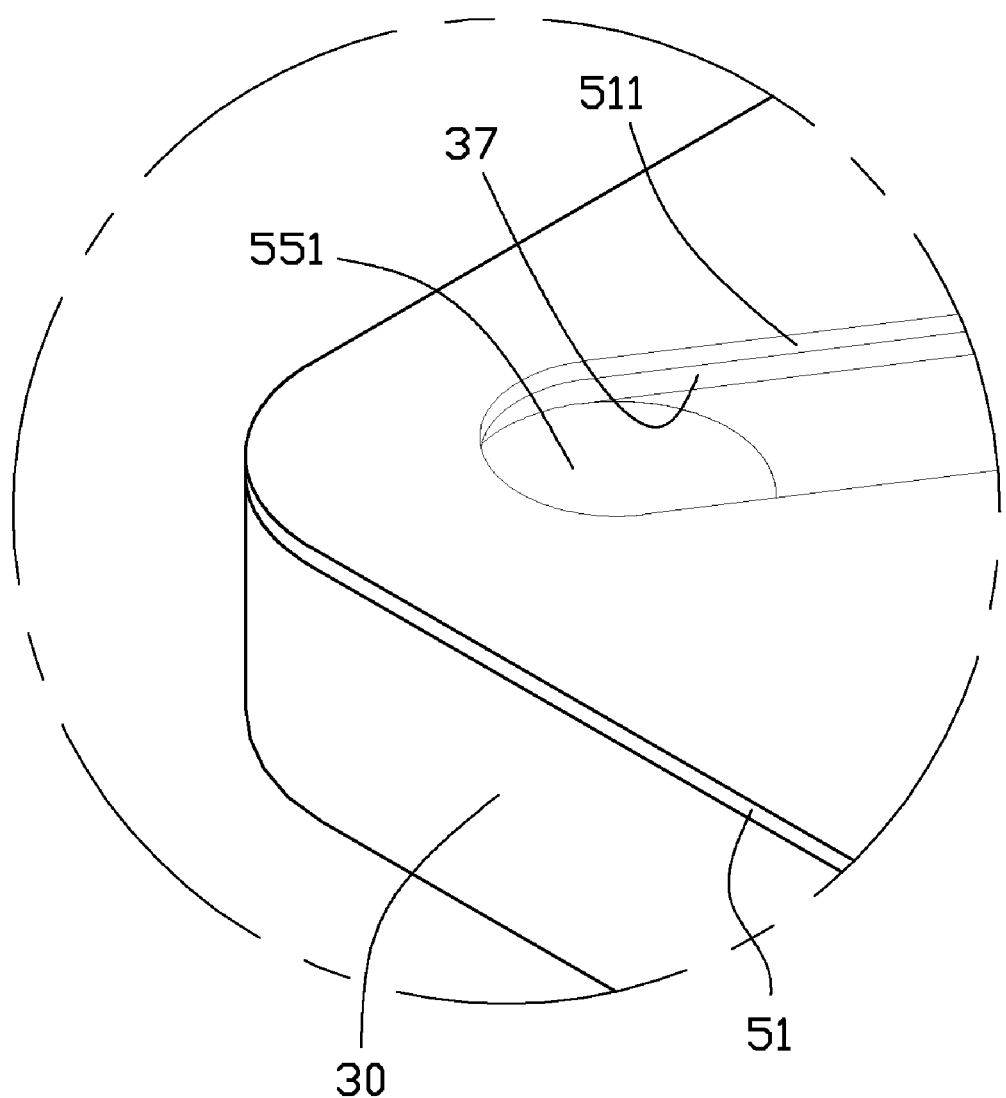
FIG. 5 is an enlarged view of the FIG. 4.
Figure 6:
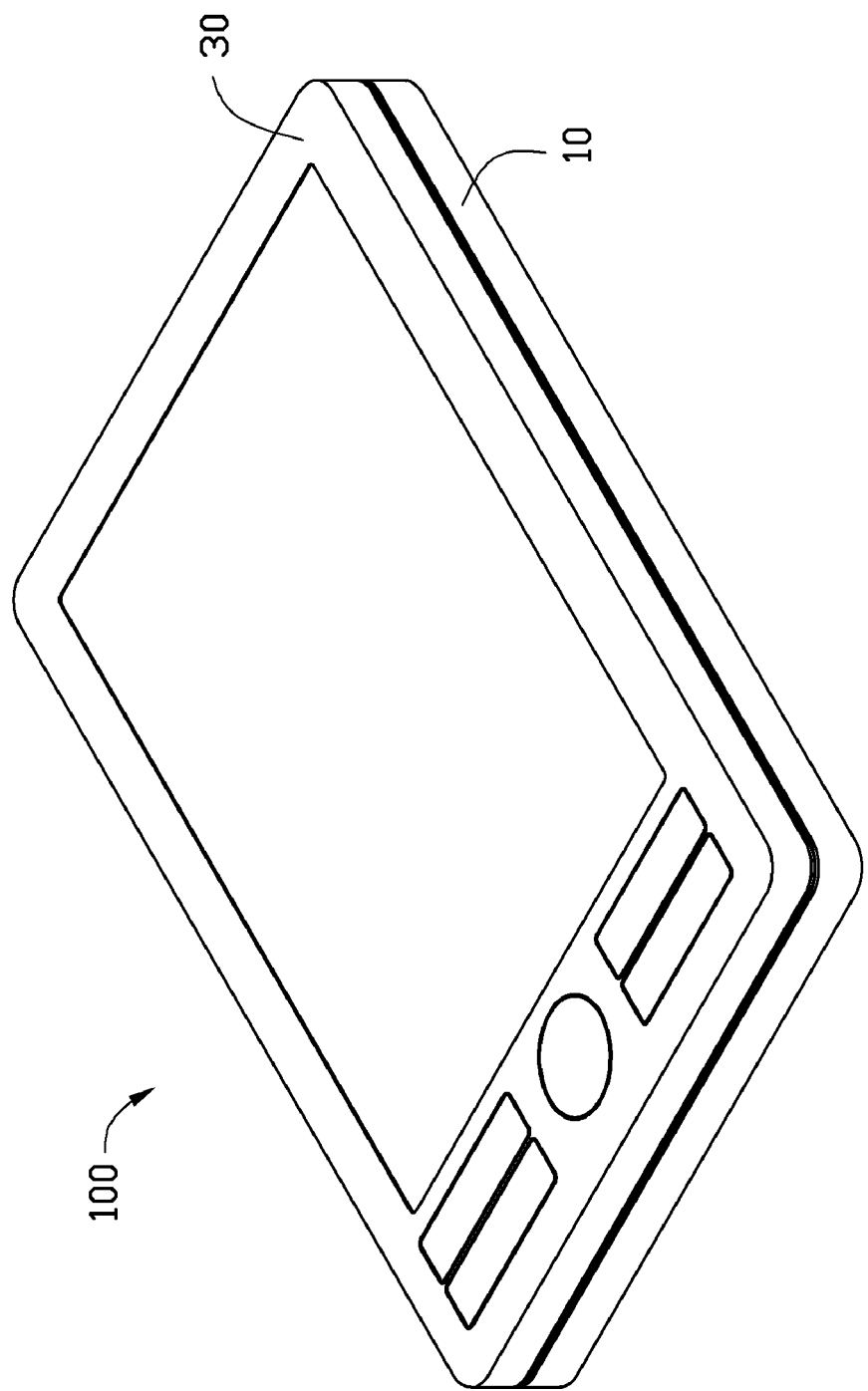
FIG. 6 is an assembled, isometric view of the portable electronic device showing in FIG. 1.
Figure 7:
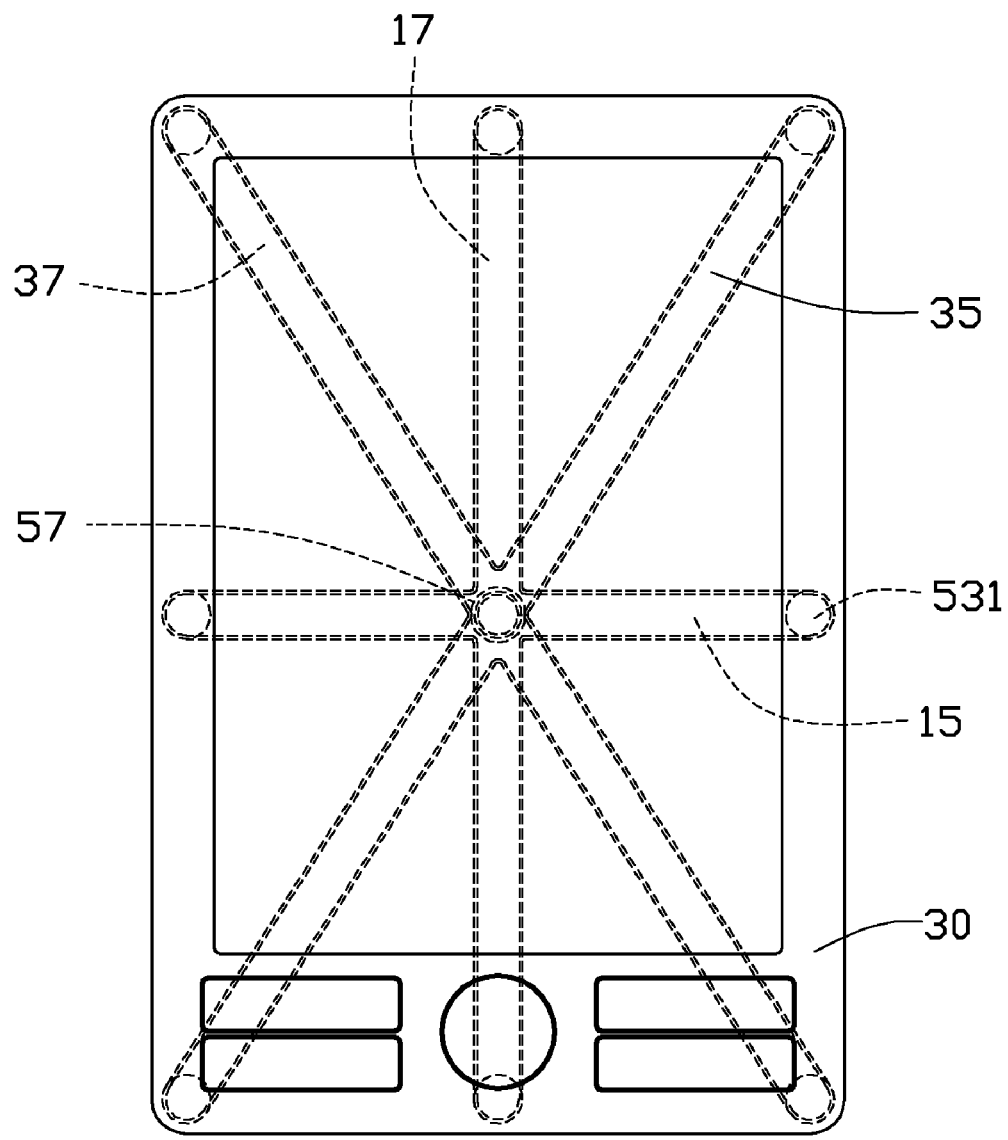
FIG. 7 is an assembled, isometric view of the portable electronic device showing the sliding slots.

Referring to FIGS. 4 and 5, during assembly of the portable electronic device 100, the five second magnetic elements 551 are respectively secured in the first receiving hole 151 to the fifth receiving hole 155 of the base 10 such as by press-fit. The five first magnetic elements 531 are respectively secured in the first receiving cavity 351 to the fifth receiving cavity 355 of the cover 30, also such as by press-fit. One end of the connecting element 57 is slidably and rotatably secured in the slit 16 of the slots 15 or 17 and retained by the sidewalls of the slots 15 or 17 having portion narrower than the maximum diameter of the connecting element 57. The positioning panel 51 attaches to the cover 30 (such as by screws, not shown) with the connecting element 57 passing through the guiding hole 511 for securing the connecting element 57 to the cover 30. The other end of the connecting element 57 is slidably and rotatably secured in the channels 35, and 37 of the cover 30 and retained by the positioning panel 51. Thus, the portable electronic device 100 is assembled, as shown in FIG. 6. When the cover 30 attaches to the base 10 as shown in FIG. 7, the connecting element 57 is attracted by both of the first magnetic elements 531 secured in the fifth receiving cavity 355 of the cover 30 and the second magnetic element 551 secured in the fifth receiving hole 155 of the base 10.

Figure 8:
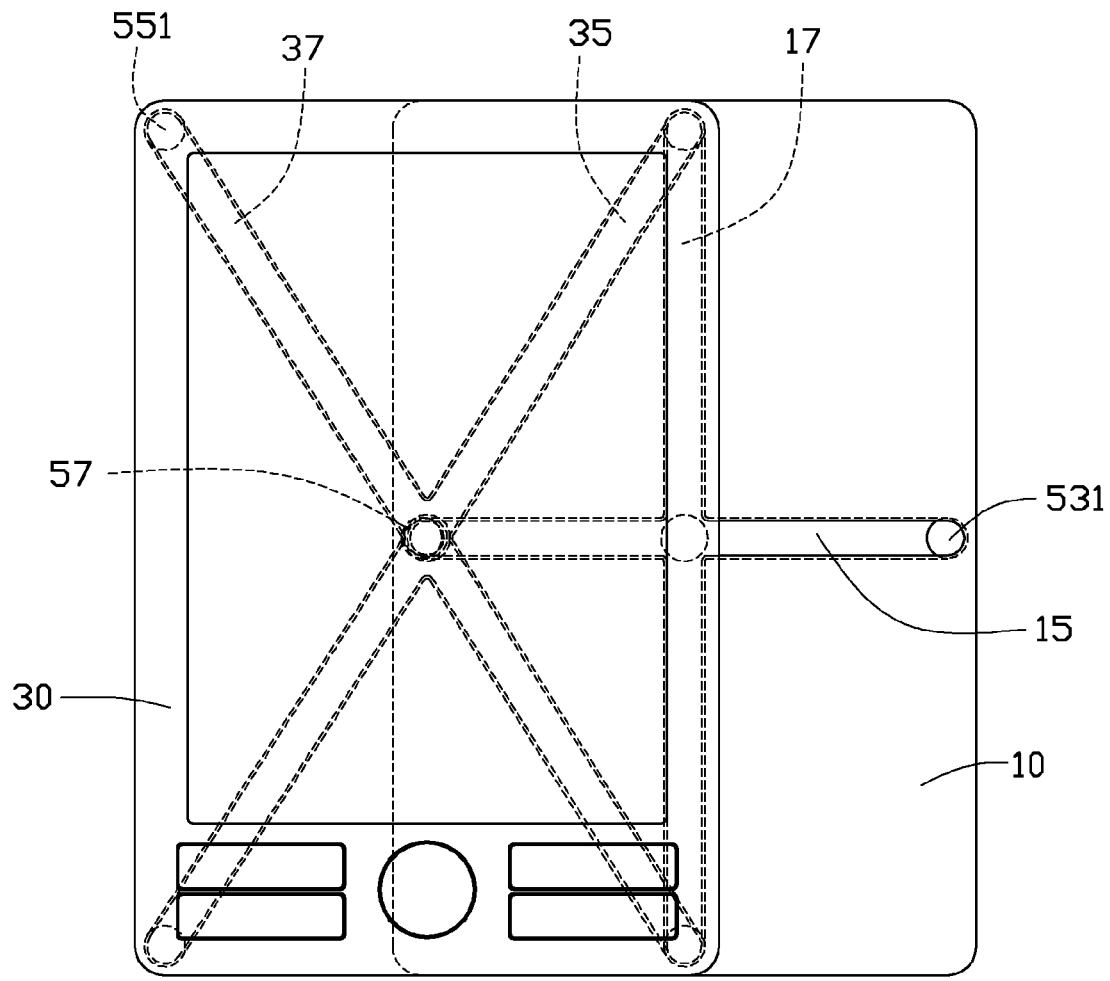
FIG. 8 is isometric view of electronic device of the portable electronic device showing the cover in an open state.
Figure 9:
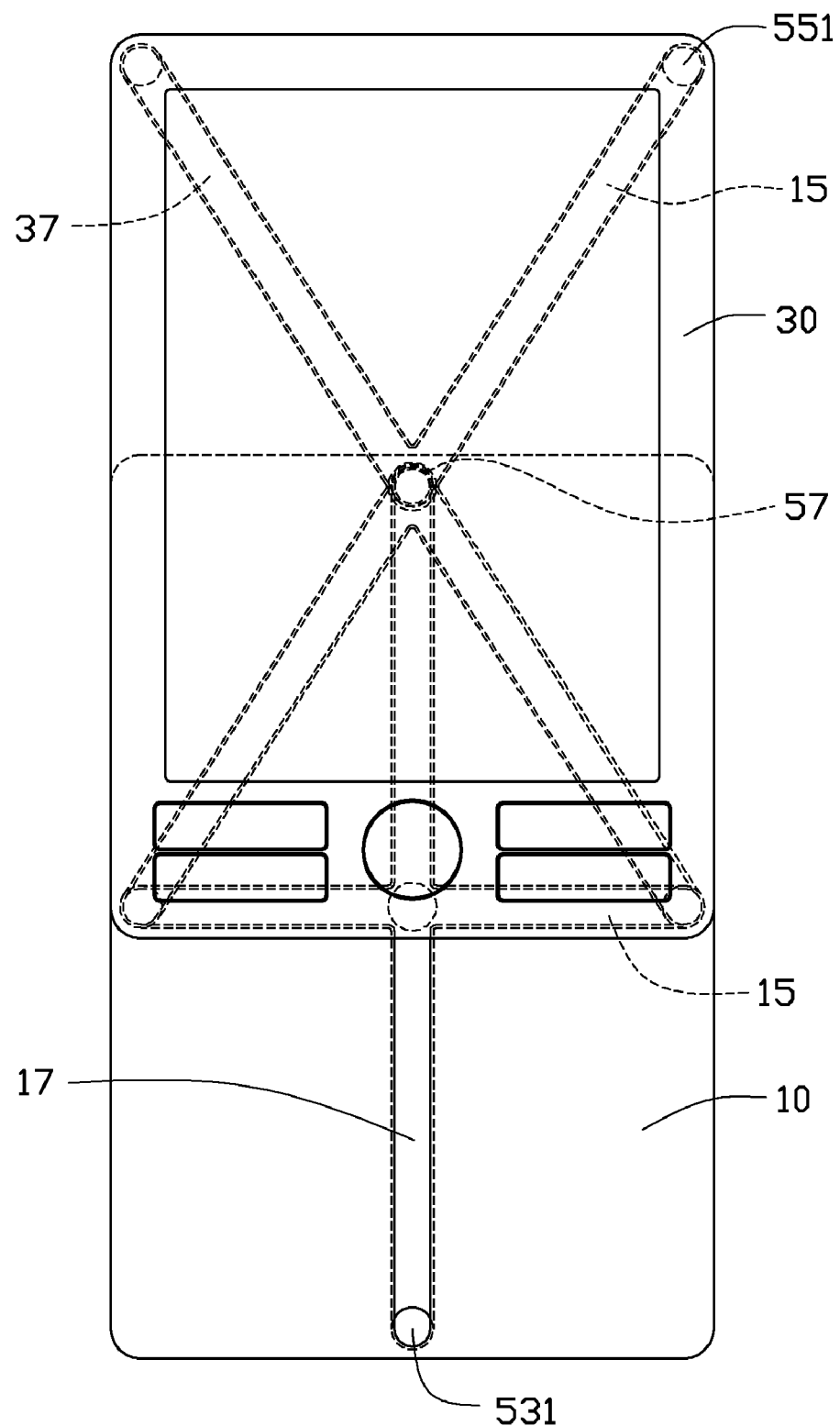
FIG. 9 is similar to FIG. 8, but showing the cover moved upwards.

Referring to FIGS. 8 to 9, when sliding the cover 30 with respect to the base 10 along the sliding slots 15 and/or 17, the connecting element 57 stays in the cover 30 due to the resistance of the cover 30, and is attracted by the first magnetic element 531 received in the fifth receiving cavity 355 of the cover 30. The cover 30 will stay stable on the base 10 when the connecting element 57 is attracted by any second magnetic element 551 received in the receiving bore of the base 10 and retained by the sidewalls of the slots 15 and/or 17.

Figure 10:
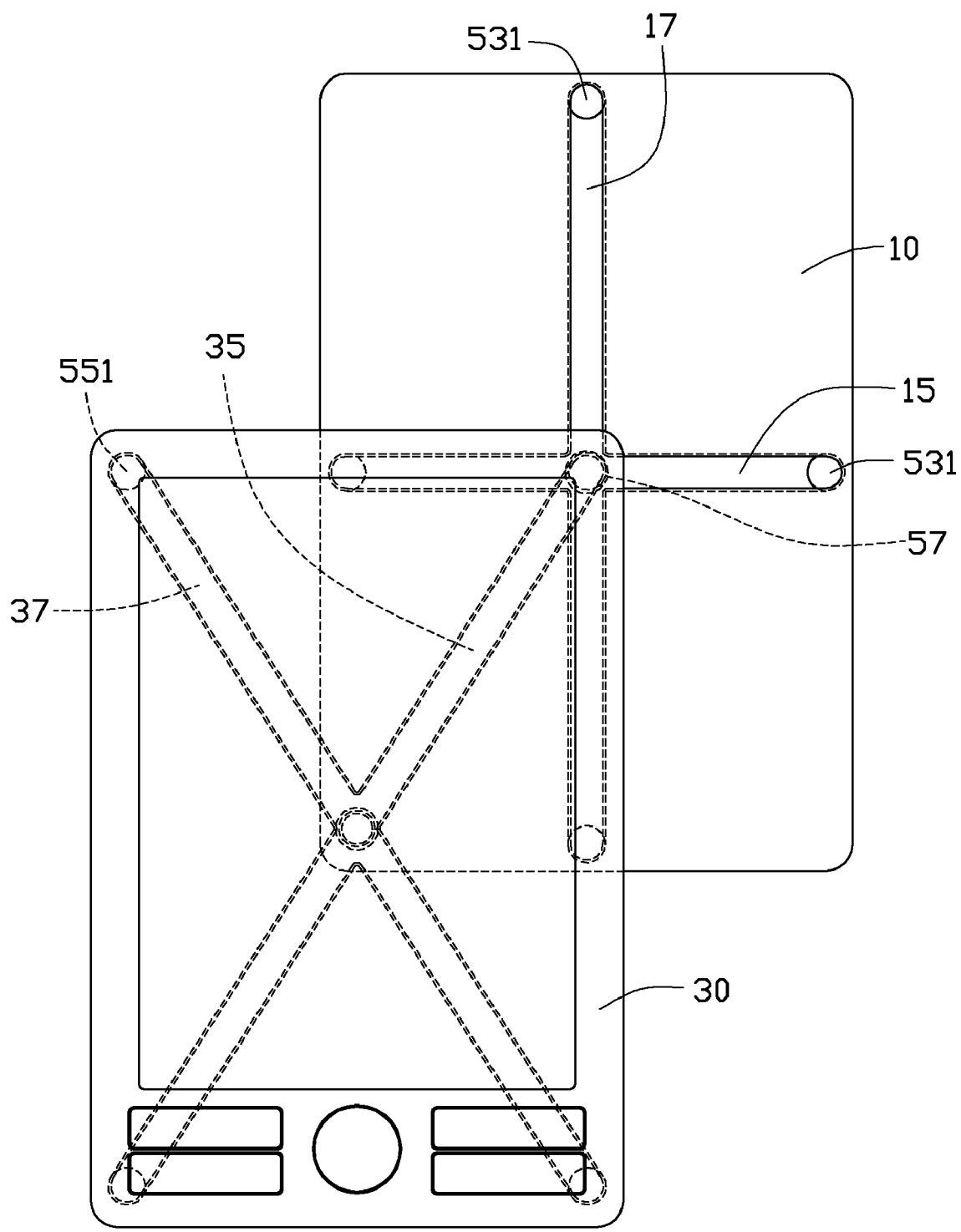
FIG. 10 is similar to FIG. 9, but showing the cover moved to a corner of the base.

Referring to FIG. 10, similarly, when sliding the cover 30 relative to the base 10 along the channels 35 and/or 37, the connecting element 57 stays in the base 10 due to the resistance of the base 10 and retained by positioning panel 51, and is ultimately attracted by the second magnetic element 551 received in the fifth receiving hole 155. The cover 30 will then stay stable on the base 10 when the connecting element 57 is attracted by any first magnetic element 531 received in the receiving cavity of the cover 30.

Figure 11:
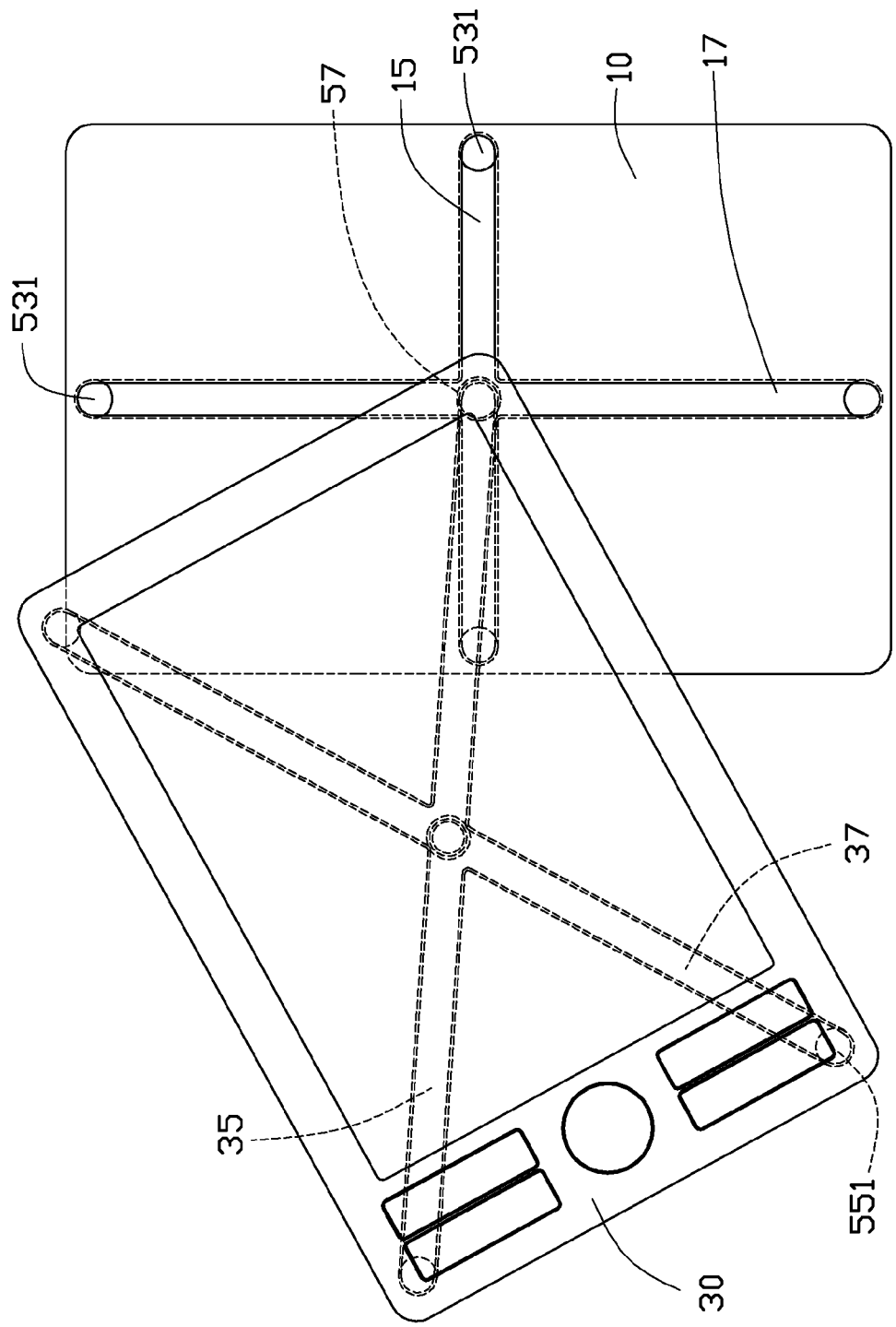
FIG. 11 is an isometric view of the portable electronic device showing the cover rotated related to the base.

Referring to FIG. 11, when rotating the cover 30 related to the base 10, the cover 30 stays stable on the base 10 by the magnetic force of the first positioning elements 53 and the second positioning elements 55. It is noteworthy, that the cover 30 could be rotated, related to the base 10 wherever the cover 30 stays on the base 10.

Figure 12:
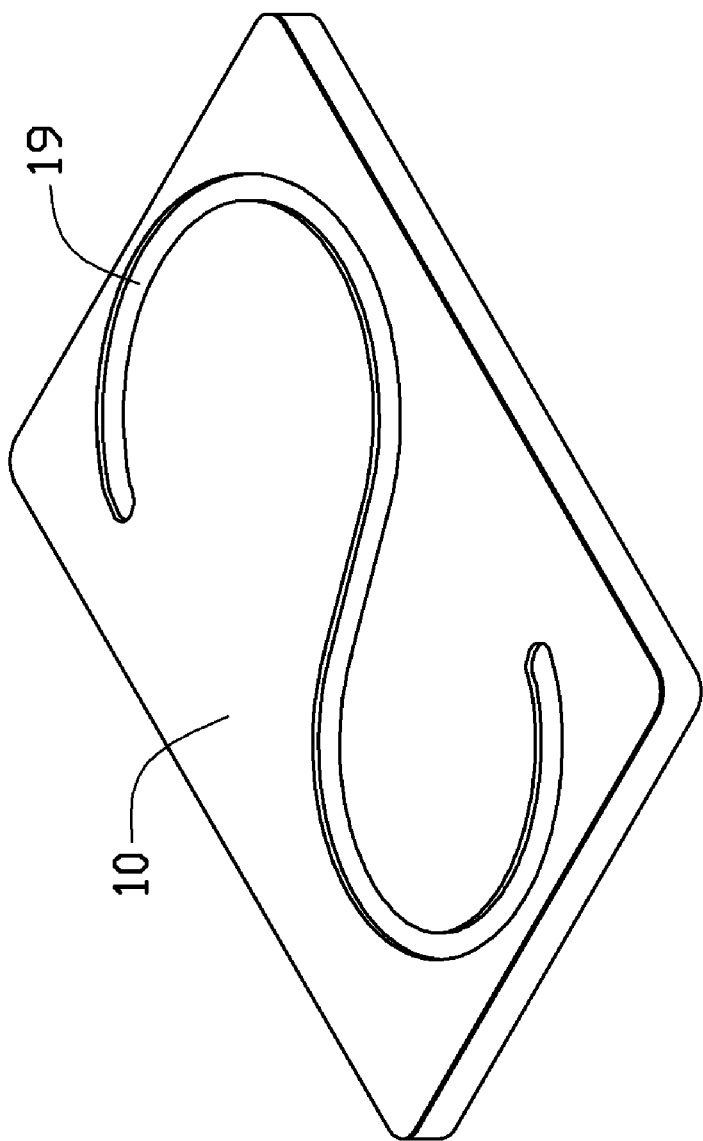
FIG. 12 is an isometric view of a second embodiment of a base for a portable electronic device.

Referring to FIG. 12, in the second exemplary embodiment, the base 10 defines an S-shaped sliding slot 19. Thus, the user can slide the cover 30 along the sliding slot 19.

It is to be understood that the quantity of the first magnetic element 531 and the second magnetic element 551 could vary on demand. Furthermore, the pattern of the sliding slots 15, and 17, or the channels 35, and 37 could be different from the exemplary embodiments. What's more, the connecting element 57 could be made of soft magnetic material such that the first positioning elements 53 and the second positioning elements 55 could selectively attract the connecting element 57.

In the portable electronic device 100 disclosed by the above mentioned embodiment, the first positioning element 53 and the second positioning element 55 provides the magnetic force to combine the cover 30 and the base 10. Thus, the portable electronic device 100 will not fatigue in a short time. One end of the connecting element 57 is slidably and rotatably received in the first sliding slots 15 and 17 and retained by the sidewalls of the first sliding slots 15 and 17, the other of the connecting element 57 is slidably and rotatably received in the first channels 35 and 37 and retained by the positioning panel 51. By applying the connecting element 57, the cover 30 slides and rotates related to the base 10, thus the portable electronic device 100 is fashionable.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device comprising:
    a base;
    a cover;
    a plurality of first positioning elements mounted to the base;
    a plurality of second positioning elements mounted to the cover; and a connecting element slidably and rotatably connecting the base to the cover; the first positioning elements attracting the second positioning elements by magnetic force;
    wherein the base defines a sliding slot, the cover defines a channel, one end of the connecting element is slidably and rotatably received in the sliding slot and the other end received in the channel, the sliding slot is a crossbar, and the channel is a pattern of X-shape.

2. The portable electronic device as claimed in claim 1, wherein the sidewalls of the sliding slot define a slit, one end of the connecting element is slidably and rotatably received in the slit.

3. The portable electronic device as claimed in claim 1, wherein the first positioning elements are five first magnetic elements, the second positioning elements are five second magnetic elements to attract the first magnetic elements.

4. The portable electronic device as claimed in claim 3, wherein the connecting element is made of soft magnetic material.

5. The portable electronic device as claimed in claim 1, wherein the portable electronic device further comprises a positioning panel defining a through guiding hole to receive the connecting element, the positioning panel is mounted to the cover.

6. The portable electronic device as claimed in claim 1, wherein one end of the connecting element is fixed to the cover and the other end is slidably and rotatably attached to the base.

7. A portable electronic device comprising: a base; a cover; a plurality of first positioning elements attached to the base; a plurality of second positioning elements attached to the cover; and a connecting element made of magnetic material slidably and rotatably connecting the base with the cover; the first positioning elements attracting the second positioning elements by magnetic force;
    wherein the base defines a sliding slot, the cover defines a channel, one end of the connecting element is slidably and rotatably received in the sliding slot and the other end is received in the channel, the sliding slot is crossing-shaped, and the channel is X-shaped.

8. The portable electronic device as claimed in claim 7, wherein the first positioning elements are five first magnetic elements, the second positioning elements are five second magnetic elements to attract the first magnetic elements.

9. The portable electronic device as claimed in claim 7, wherein the portable electronic device further includes a positioning panel defining a through guiding hole to receive the connecting element, the positioning panel is mounted to the cover.

10. The portable electronic device as claimed in claim 7, wherein one end of the connecting element is fixed in the cover and the other end is slidably and rotatably attached to the base.

\* \* \* \* \*